June 29, 1943.         O. N. BRYANT         2,323,115
HYDRAULIC RESISTANCE APPARATUS
Filed May 20, 1942            3 Sheets-Sheet 1
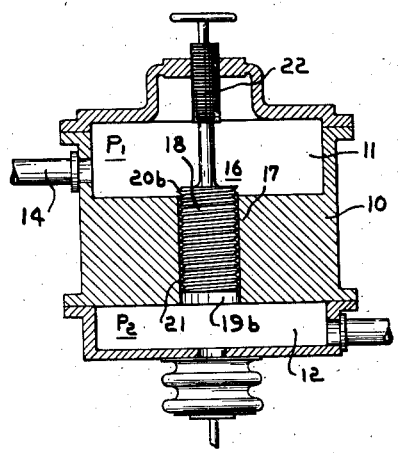
FIG. 1.
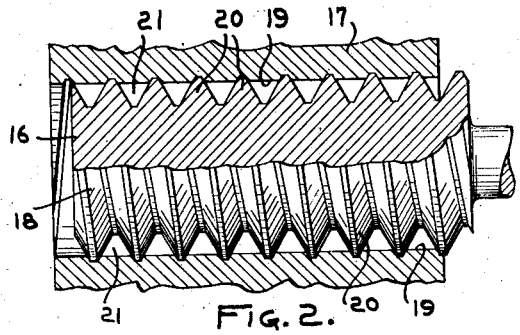
FIG. 2.
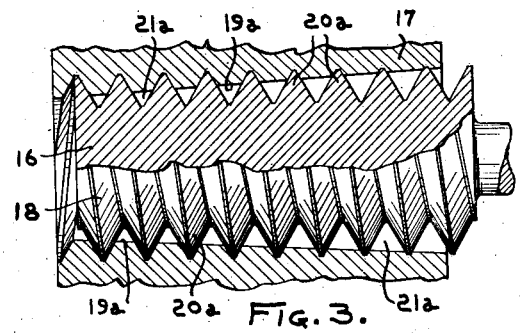
FIG. 3.
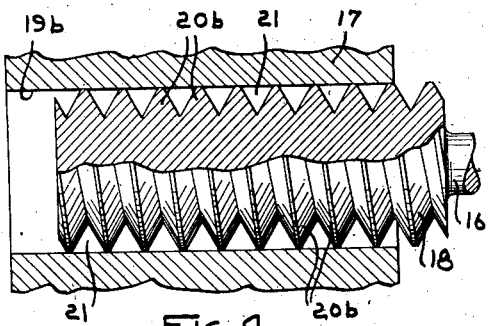
FIG. 4.
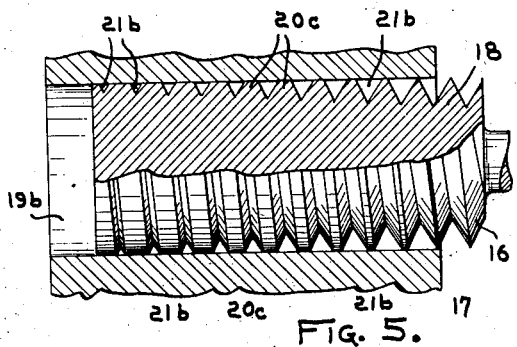
FIG. 5.
FIG. 6.
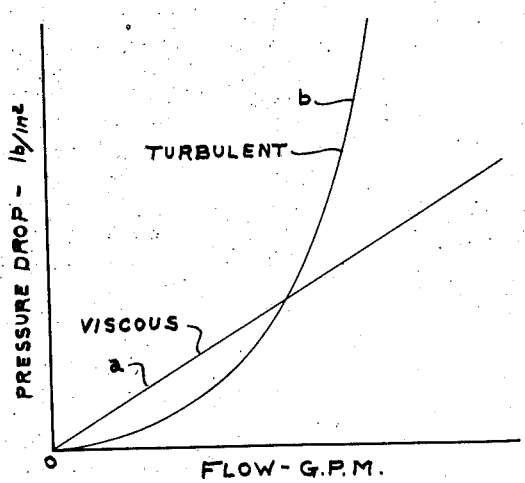
WITNESSES:
J. K. Mosser
E. V. Arnold
INVENTOR
OZRO N. BRYANT.
BY
ATTORNEY

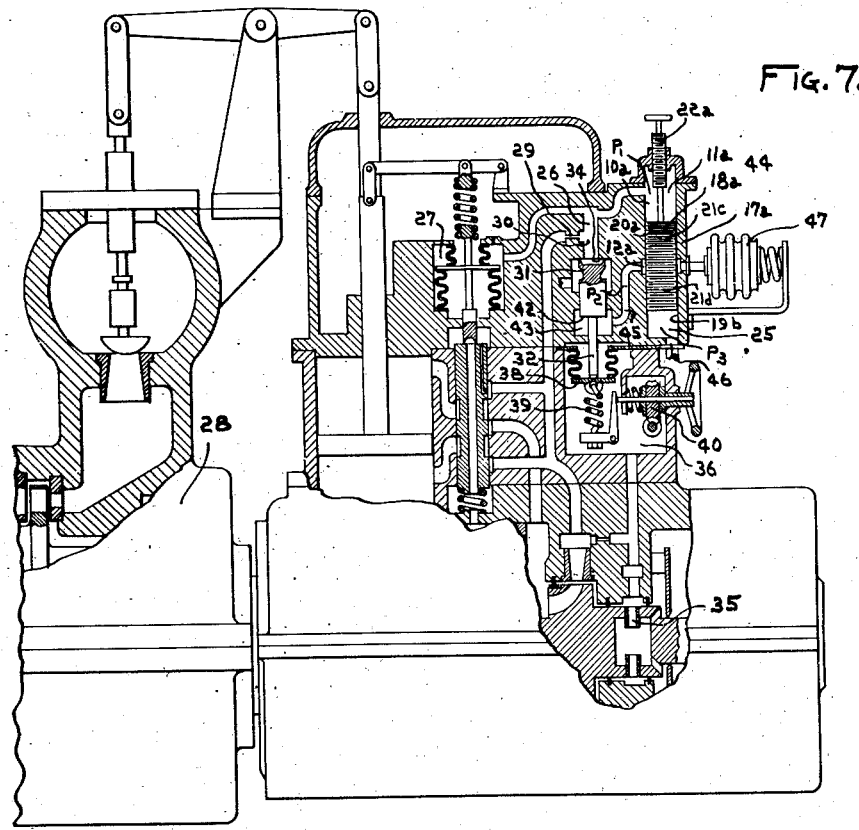
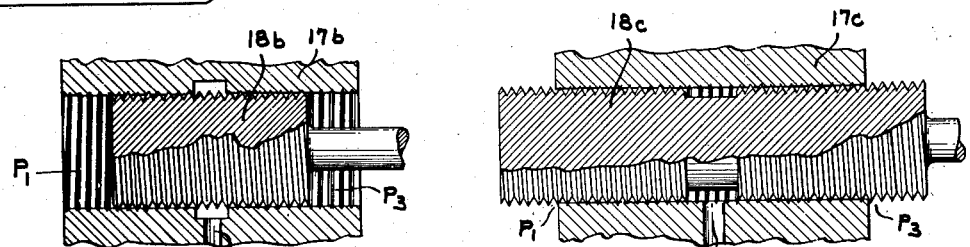
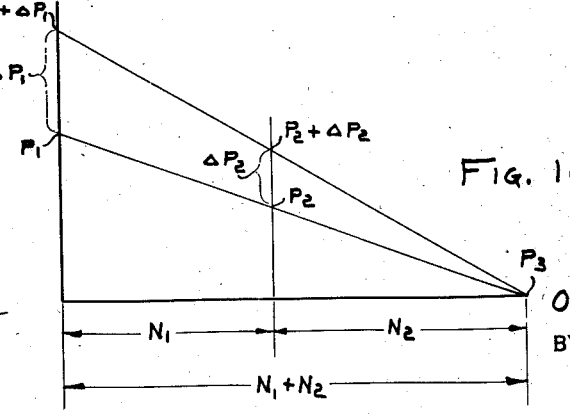

June 29, 1943.  O. N. BRYANT  2,323,115
HYDRAULIC RESISTANCE APPARATUS
Filed May 20, 1942  3 Sheets-Sheet 3
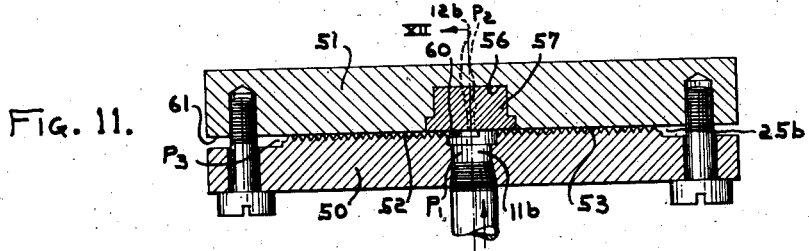
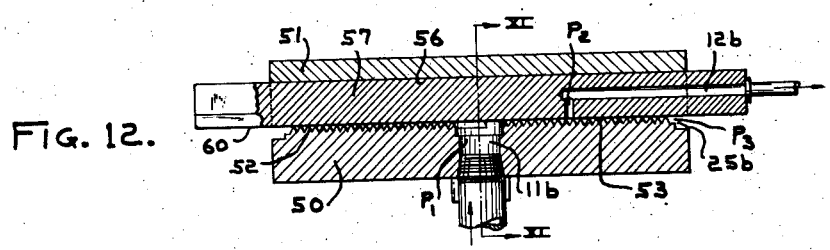
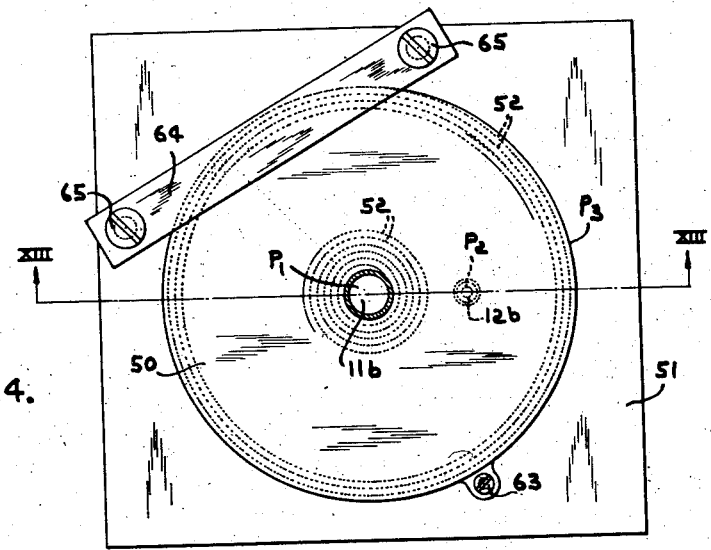
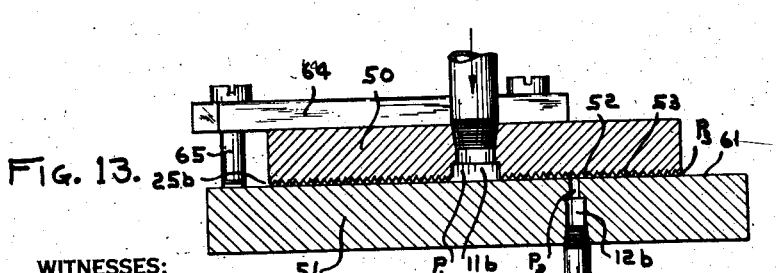
INVENTOR
OZRO N. BRYANT.
BY
ATTORNEY Patented June 29, 1943

2,323,115

UNITED STATES PATENT OFFICE 2,323,115

HYDRAULIC RESISTANCE APPARATUS

Ozro N. Bryant, Prospect Park, Pa., assignor to Westinghouse Electric & Manufacturing Company, East Pittsburgh, Pa., a corporation of Pennsylvania Application May 20, 1942, Serial No. 443,777

7 Claims. (Cl. 138—43)

The invention relates to hydraulic control circuits and it has for an object to provide a viscous flow passage or orifice connecting first and second liquid pressure spaces and wherein the length of the flow passage may be changed to secure a proportionate change in the pressure difference of the spaces.

A further object of the invention is to provide first, second and third pressure spaces and a viscous flow passage including a first portion connecting the first and second spaces and a second portion connecting the second and third spaces, together with means for maintaining liquid under pressure in the first space and means providing for variation in the length of the viscous flow passage to secure proportionate variation in pressure in the second space independently of changes in viscosity of the liquid.

There are many places in hydraulic control circuits where it is desirable that the flow shall be proportional to the pressure difference instead of being proportional to the square root of the pressure difference, as is the case with the ordinary sharp-edge orifice and the like wherein the flow is turbulent. In these situations, it has been customary to provide long capillary tubes, holes of small diameter, or long annular clearances of small radius; however, such devices are difficult to adjust to vary the resistance, they clog easily, and are not readily cleaned. In accordance with the present invention, the viscous orifice or flow passage is defined between members by a helical or spiral thread on at least one of the members and cooperating with the other member to provide the passage so that, by relative adjustment of the members, the effective length of the helical passage may be varied. Assuming, for example, that the inner member is a screw 1 inch long and ¾ of an inch in diameter with 10 threads per inch, this is equivalent to a capillary tube 22 inches in length; and, if the outer member has its internal threads reamed out to 0.725 diameter, the cross-sectional area of the resulting helical passage is equivalent to a circle whose diameter is .053 inch.

The helical or spiral viscous orifice or flow passage defined by cooperating members may be arranged in a manner analogous to an electrical potentiometer, that is, the passage may connect first, second and third pressure spaces, the second space being closed, liquid under pressure being maintained in the first space, and the members may be adjusted to secure variation in flow passage length between the first and second spaces with the proportionate variation in pressure of the second space. The viscous flow passage may be so formed that relative adjustment of the members results in change in length of one or both of the portions thereof connecting the first and second spaces and the second and third spaces, or the lengths of the portions may be changed oppositely to an equal extent while maintaining the same total length between the first and third spaces. I prefer to use an arrangement where the same pressure drop and flow are maintained between the first and third spaces, while the pressure drop or resistance between the first and second pressure spaces is varied an amount proportional to the adjustment for the reason that the property of proportionality is not affected by variations in viscosity because such variations affect both ends of the device equally.

A further object of the invention is to provide a helical or spiral viscous orifice or flow passage connecting higher and lower pressure spaces and formed by a thread on at least one of the cooperating members, and wherein the members are relatively adjustable to vary the effective length of the viscous orifice or flow passage.

A further object of the invention is to provide first, second and third pressure spaces connected by helical or spiral viscous orifice or flow passage portions provided by a pair of members, at least one of the members being threaded and cooperating with the other member to form the helical viscous flow passage portions, together with means for maintaining liquid under pressure in the first space and means for adjusting the inner member with respect to the outer member to effect adjustment in the length of the viscous orifice or flow passage portion between the first and second spaces to vary the pressure in the latter to an extent proportionate to the variation in flow passage length.

These and other objects are effected by the invention as will be apparent from the following description and claims taken in connection with the accompanying drawings, forming a part of this application, in which:

Fig. 1 is a sectional view of apparatus having the improved viscous orifice applied thereto;

Figs. 2, 3, 4 and 5 are enlarged sectional detail views showing cooperating threads formed to provide helical orifices;

Fig. 6 is a diagram showing relations between flow and pressure drop;

Fig. 7 is a sectional and diagrammatic view showing the potentiometer form of the viscous orifice applied to a governing system;

Fig. 8 is an enlarged sectional view showing one type of the potentiometer arrangement;

Fig. 9 is a view similar to Fig. 8 but showing a second type of the potentiometer arrangement;

Fig. 10 is a diagram showing relations involved in the adjustment of the potentiometer arrangement; and, Figs. 11, 12, 13 and 14 show further forms of apparatus providing the potentiometer viscous orifice arrangement, Figs. 11, 12 and 13 being sectional views and Fig. 14 being a plan view of the apparatus shown in Fig. 13.

In Fig. 1, there is shown any suitable housing structure 10 having chambers 11 and 12. Liquid pressure is maintained in the chamber 11 by any suitable means including the passage 14.

The chambers 11 and 12 are connected by an orifice device, at 16, comprising an outer member 17 and an inner or plug member 18. Either or both of the members are threaded to provide a helical viscous orifice or flow passage 21 whose flow area is sufficiently small in relation to its length to secure viscous capillary or stream line flow as distinguished from turbulent flow.

By moving the inner member 18 in or out with respect to the outer member, the effective length of the helical viscous orifice or flow passage 21 may be varied to secure proportionate variation in pressure drop or resistance thereof to provide, for example, for a pressure in the chamber 12 which varies in proportion to the variation in length of the flow passage. Where only one of the members is threaded, one thereof may be provided with a threaded stem 22 (Fig. 1) for effecting adjustment.

The device so far described is preferable to a needle valve because of the linear relation existing between flow and pressure drop. Referring to Fig. 6, the relation between flow and pressure drop for a viscous orifice is a straight line, the line $a$, whereas, for a turbulent flow orifice, the relation is a curve, curve $b$, since the flow varies as the square root of the pressure drop. Fig. 6 shows how ineffective the turbulent type becomes at small flows as compared with the viscous type and shows why time-delay devices or damping devices, such as dashpots, should always use the viscous type of resistance.

Since, with the viscous type of orifice, the flow varies directly as the pressure drop or resistance, there exists a linear relation of length of the viscous orifice or flow passage with respect to pressure drop and flow. Assuming that the pressure of the chamber 11 is $P_1$ and that in the chamber 12 is $P_2$, then the resistance to flow is increased or decreased directly in relation to the extent of adjustment of the inner member 18; and, $P_1$ remaining the same, $P_2$ may be changed proportionately to the change in length of the viscous orifice or flow passage.

The viscous orifice or flow passage may be provided by having only one of the inner and outer members threaded (Figs. 1 and 4) or by having both of them threaded, threads 19 and 20 of Fig. 2, with the top portion of one of the threads removed to leave a helical passage 21. If, as shown in Fig. 2, the upper portion of one of the threads is removed on a uniform radius from end to end, the helical passage 21 will be of uniform cross-sectional area throughout its length. To secure a larger range of adjustment of resistance, for an adjustment range of the members, as shown in Fig. 3, one of the threads, the thread 19a, may be removed in a tapered manner or along a progressively changing radius so that the passage 21a, defined with respect to the other thread 20a, tapers in flow area from one end to the other.

Only one of the inner and outer members may be threaded, the thread cooperating with the other member to form the helical viscous flow passage. For example, in Figs. 1 and 4, the inner member has a thread 20b fitting closely the cylindrical bore 19b of the outer member to form the passage. In Fig. 5, the height of the thread 20c progressively increases from one end to the other to provide for a helical passage 21b tapering in flow area from end to end, as in Fig. 3.

In Figs. 7, 8 and 9 are shown potentiometer arrangements of the orifice device. In these views, the structure 10a is provided with first, second and third spaces 11a, 12a and 25, with the second space disposed between the first and third spaces. As shown, inner and outer, or telescoping, members provide the viscous orifice or flow passage between the first space 11a and the third space 25, the viscous flow passage or orifice comprising a first portion 21c between the first and second spaces and a second portion 21d between the second and third spaces.

Assuming that the pressure $P_1$ in the space 11a is higher than the pressure $P_3$ in the space 25 and that the pressure $P_2$ in the space 12a has an intermediate value, then the relation of these pressures may be changed by adjusting the inner member 18a with respect to the outer member 17a, the ratio of pressure drops being $$\frac{P_1 - P_2}{P_2 - P_3} = \frac{N_1}{N_2}$$

where $N_1$ is equal to the number of threads between $P_1$ and $P_2$ and $N_2$ is the number of threads between $P_2$ and $P_3$.

From Fig. 10, it will be apparent that if $P_1$ changes by an amount $\Delta P_1$, then $P_2$ will change by an amount $\Delta P_2$, and $$\frac{\Delta P_1}{\Delta P_2}$$

will equal $$\frac{N_1 + N_2}{N_2}$$

when $P_3$ is constant. With the intermediate pressure chamber closed, this property of proportionality is not affected by variations in viscosity because such variations affect both ends of the device equally since the flows are equal and since the pressure drop varies directly as the flow, the viscosity and the length of the helical passage.

In Fig. 8, as the inner member 18b is shorter than the outer member 17b, it may be adjusted axially without varying the overall length of the helical passage between $P_1$ and $P_3$ while varying the relative lengths thereof between $P_1$ and $P_2$ and between $P_2$ and $P_3$. Adjustment of the inner member to dispose either end beyond the corresponding end of the outer member has the effect of varying the overall length of the viscous orifice or flow passage and of varying the number of threads of one portion with respect to the other.

In Fig. 9, there is shown an arrangement wherein the inner member 18c is longer than the outer member 17c. With this arrangement, the number of threads $N_1$ between $P_1$ and $P_2$ or the number $N_2$ between $P_2$ and $P_3$ may be varied while maintaining the total number of threads, $N_1 + N_2$ constant.

In Fig. 7, there is shown the application of the potentiometer arrangement for speed-correcting adjustment of a governor, the latter including a space, at 26, for fluid under pressure for the pressure-responsive apparatus, at 27, for controlling the admission of motive fluid to the prime mover or turbine 28. An orifice 29 supplies fluid from a suitable pressure source to the space, at 26, and the pressure in the latter depends upon the rate of escape therefrom provided by the cooperating escape port 30 and valve 31. The valve 31 is adjusted in relation to the port by an operating member 32 to which force dependent upon speed of the prime mover is applied.

As shown, the valve 31 is of the cup type, which cooperates with the seat 34 bounding the port 30 and which defines or bounds an area subject to pressure existing in the space, at 26. Also, while any suitable means may be used to develop and apply to the operating member 32 a force dependent upon speed, as shown, this purpose is achieved by means of an impeller 35 driven by the turbine and developing fluid under pressure for the chamber 36. Fluid pressure in the chamber 36 acts on the abutment 38 against the load spring 39 to apply force to the operating member 32. The lower end of the load spring 39 is connected to suitable speed changer apparatus, at 40.

With a decrease in load, the force dependent upon speed increases and acts on the operating member 32 to cause the valve 31 to restrict the escape of fluid between the latter and its seat 34 to increase the pressure in the space, at 26, and operate the apparatus, at 27, to restrict the supply of motive fluid to the turbine. Increase in space pressure is accompanied by increase in force thereof acting on the cup valve pressure area; and, for a given decrease in load, the space pressure increases until the change in force thereof acting on the cup valve balances the change in force applied to the operating member 32 and corresponding to the decrease in load. With increase in load, the contrary operation occurs.

The governing arrangement so far described would, of necessity, operate at a higher speed at no load than at full load, that is, it would inherently have the usual regulation. To provide for reduction in speed change due to load change, the operating member 32 has a piston area 42 equal to and opposed to the cup valve area, and a pressure chamber 43 is provided for the area 42. Passages 44 and 45 provide for communication between the space, at 26, and the chamber 43.

In Fig. 7, the first pressure space 11a, provided by the passage 44, is connected by the viscous flow passage portion 21c to the second pressure space 12a, the latter being connected by the second passage 45 to the chamber 43 for the piston face area 42. The third pressure space 25 is shown as being provided by the third or drain passage 46 and is connected to the second space 12a by the second viscous flow passage portion 21d. A time delay bellows 47 is connected to the second space 12a and it functions to provide delay in changes in pressure in the chamber 43 with respect to changes in the space, at 26, to give stability to the governing apparatus.

The structure 10a provides the outer member 11a cooperating with the inner member or plug 18a. As already pointed out, either or both of these members may be threaded so as to provide the viscous flow passage; and, as shown, the outer member has a smooth internal bore 19b cooperating with the plug thread 20a to provide the first helical viscous flow passage portion 21c connecting the $P_1$ pressure space 11a to the $P_2$ pressure space 12a, and the second helical viscous flow passage 21d connecting the second pressure space to the $P_3$ pressure space 25. By adjusting the inner member or plug 18a to reduce the effective length of the viscous flow passage between the $P_1$ pressure space 11a and the $P_2$ pressure space 12a without changing the length thereof between the $P_1$ and $P_3$ pressure spaces, the pressure $P_2$ increases in relation to the pressure $P_1$, adjustment of the plug being accomplished, for example, by means of the threaded stem 22a.

In operation, speed correction due to load change is effected by pressure provided in the chamber 43. As this pressure is increased due to shortening of the first viscous orifice or flow passage portion 21c, the extent of correction is increased until, with the pressures in the space, at 26, and in the chamber 43 equal, isochronous operation is secured.

The application of the potentiometer arrangement for controlling the pressure in the chamber 43 is desirable because of the linear relation existing as between plug adjustment and the extent of pressure change. Thus, the pressure in the chamber 43 may be raised and lowered proportionately to the movement of the plug member 18a. Changes in viscosity of the liquid do not modify the operation, since a change in the first orifice portion 21c is balanced by the same in the second orifice portion 21d.

In Figs. 11 to 14, inclusive, there are shown modified forms of the viscous orifice construction wherein, instead of telescopic members, plates 50 and 51 are used, the plate 50 having a spiral rib 52 defining a spiral groove 53 of suitably small cross sectional area and which is covered by the plate 51. The plate 51 is constructed to provide a space communicating with the groove at a point intermediately of the length thereof and the plate incorporates an adjustable feature to provide for orifice length variation, as already described.

In Figs. 11 and 12, the inner end of the spiral groove 53 communicates with the $P_1$ pressure space 11b and the outer end communicates with the $P_3$ pressure space 25b. The plate 51 is formed with a guideway 56 for the slide 57, the latter providing a space 12b arranged to communicate with the spiral groove 53. As the inner face 60 of the slide is flush with the inner face 61 of the plate 51, both of said inner faces function to cover the spiral groove; however, as the slide 57 is capable of longitudinal adjustment, the space 12b may be brought into communication with the spiral groove at any suitable point along the length thereof.

If the slide 57 is adjusted longitudinally, the length of the viscous orifice between the pressure spaces $P_1$ and $P_2$ may be increased, while that between the pressure spaces $P_2$ and $P_3$ is decreased and vice versa.

In Figs. 13 and 14, variation in viscous orifice lengths is secured by having the plate 50 hinged, at 63, to the plate 51 and by providing the latter plate with a pressure space 12b communicating with the spiral groove 53. If relative angular motion of the plates is secured, it will be apparent that space 12b may be moved inwardly or outwardly with respect to the plate 50 to vary the viscous orifice lengths between the pressure spaces P₁ and P₂ and between P₂ and P₃. Assuming that relative angular adjustment of the plates has been made to the desired extent, then the plates may be locked together by any suitable means, for example, by the strap 64 adapted to overlap the plate 50 and having its extremities connected to the plate 51 by means of threaded fastenings 65.

The word "spiral" is used herein in a sense broad enough to embrace "helical," whereas "helical" is used in its narrower geometrical sense.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In hydraulic apparatus, means providing first, second and third pressure spaces with the second space disposed between the first and third spaces; means for maintaining a first liquid pressure in said first space; means providing a first viscous flow passage connecting the first and second spaces and a second viscous flow passage connecting the second and third spaces; said first viscous flow passage being effective to maintain fluid under second pressure in said second space; and means for changing the length of the first viscous flow passage to change the second pressure directly in relation to the change in length.

2. In hydraulic apparatus, means providing first, second and third pressure spaces with the second space disposed between the first and third spaces; means for maintaining a first liquid pressure in said first space; means providing a first viscous flow passage connecting the first and second spaces and a second viscous flow passage connecting the second and third spaces; said first viscous flow passage being effective to maintain fluid under second pressure in said second space; and means for changing the lengths of the first and second viscous flow passages in opposite directions so as to change the second pressure directly in relation to the change in length of the first viscous flow passage without change in the total length of the first and second passages connecting the first and third spaces.

3. In hydraulic apparatus, means providing first, second and third pressure spaces with the second space disposed between the first and third spaces; means for maintaining a first liquid pressure in said first space; a pair of members; at least one of the members having a spiral thread cooperating with the other member to provide a spiral viscous flow passage including a first portion connecting the first and second spaces and a second portion connecting the second and third spaces; and means providing for relative adjustment of said members to effect change in length of at least one of said viscous flow passage portions.

4. The combination as claimed in claim 3, wherein the threaded member is so arranged with respect to the other member that relative adjustment of the members is effective to change the lengths of the first and second passage portions in opposite directions so as to provide for change in length of the first portion connecting the first and second spaces without change in the total length of the first and second portions connecting the first and third spaces.

5. In hydraulic apparatus, means providing first, second and third pressure spaces with the second space disposed between the first and third spaces; means for maintaining a first liquid pressure in said first space; a pair of members; at least one member having a spiral thread cooperating with the outer member to provide a viscous flow passage including a first portion connecting the first and second spaces and a second portion connecting the second and third spaces; means for adjusting the members relatively to effect viscous flow passage length variation; and means including an accumulator for enclosing the second pressure space.

6. In hydraulic apparatus, means providing first, second and third pressure spaces with the second space disposed between the first and third spaces; means for maintaining a first liquid pressure in said first space; inner and outer members; one of said members having a helical thread and the other member cooperating with the thread to provide a helical viscous flow passage including a first portion connecting the first and second spaces and a second portion connecting the second and third spaces; and means providing for relative adjustment of the members to effect change in viscous flow passage length.

7. In hydraulic apparatus, means providing first, second and third pressure spaces with the second space disposed between the first and third spaces; means for maintaining a first liquid pressure in said first space; telescopically-arranged inner and outer members having meshing external and internal threads; one of said threads having its upper portion removed from end to end so that it may cooperate with the other thread to provide a helical viscous flow passage including a first portion connecting the first and second spaces and a second portion connecting the second and third spaces; means utilizing the threads to provide for adjustment of the inner member relative to the outer member; and means including an accumulator for enclosing the second pressure space.

OZRO N. BRYANT.